(12) United States Patent
Hartmann et al.

(10) Patent No.: US 10,428,874 B2
(45) Date of Patent: Oct. 1, 2019

(54) SLIDING COMPONENT AND METHOD OF FORMING THE SAME

(71) Applicant: SAINT-GOBAIN PERFORMANCE PLASTICS PAMPUS GMBH, Willich (DE)

(72) Inventors: Juergen Hartmann, Willlich (DE); Torsten Recktenwald, Essen (DE); Simon Hufnagel, Dettelbach (DE)

(73) Assignee: SAINT-GOBAIN PERFORMANCE PLASTICS PAMPUS GMBH, Willich (DE)

(*) Notice: Subject to any disclaimer, the term of this patent is extended or adjusted under 35 U.S.C. 154(b) by 48 days.

(21) Appl. No.: 14/974,608

(22) Filed: Dec. 18, 2015

(65) Prior Publication Data

US 2016/0178006 A1 Jun. 23, 2016

Related U.S. Application Data

(60) Provisional application No. 62/094,467, filed on Dec. 19, 2014.

(51) Int. Cl.
*F16C 33/28* (2006.01)
*F16C 17/02* (2006.01)
(Continued)

(52) U.S. Cl.
CPC .............. *F16C 33/28* (2013.01); *B29D 33/00* (2013.01); *F16C 17/02* (2013.01); *F16C 33/206* (2013.01);
(Continued)

(58) Field of Classification Search
CPC ...................................................... F16C 33/28
(Continued)

(56) References Cited

U.S. PATENT DOCUMENTS 2,219,054 A * 10/1940 Palm ....................... F16C 33/28
12/133 M
3,594,049 A * 7/1971 Turner ................ F16C 11/0614
29/898.047
(Continued)

FOREIGN PATENT DOCUMENTS

DE       3342593 A1 *  6/1985 ............. B29C 70/10
DE   102009028136 B3    1/2011
(Continued)

OTHER PUBLICATIONS

ISO 9227:2006 "Corrosion tests in artificial atmospheres—Salt spray tests", Second Edition, Jul. 15, 2006.
(Continued)

*Primary Examiner* — Alan B Waits
(74) *Attorney, Agent, or Firm* — Abel Schillinger, LLP; Chi Suk Kim

(57) ABSTRACT

A sliding component including a sliding layer, and an intermediate component including at least one undercut portion, the intermediate component coupled to the sliding layer, wherein the intermediate component has a thickness, T, and wherein an exposed thickness, $T_E$, of the intermediate component is less than T. A method of forming a sliding component including providing an intermediate component including at least one undercut portion, the intermediate component having a thickness, T, and coupling a sliding layer to the intermediate component, wherein the intermediate component is partially embedded into the sliding layer, and wherein an exposed thickness, $T_E$, of the intermediate component is less than T.

20 Claims, 3 Drawing Sheets

(51) Int. Cl.
*B29D 33/00* (2010.01)
*F16C 33/20* (2006.01)

(52) U.S. Cl.
CPC .......... *F16C 33/208* (2013.01); *F16C 33/201* (2013.01); *F16C 2223/32* (2013.01); *F16C 2240/60* (2013.01)

(58) Field of Classification Search
USPC .................................................. 428/116, 131
See application file for complete search history.

(56) References Cited

U.S. PATENT DOCUMENTS

| | | | | |
|---|---|---|---|---|
| 4,084,863 A * | 4/1978 | Capelli | ................... | F16C 11/06 384/202 |
| 4,846,590 A * | 7/1989 | Teramachi | ............. | B22D 19/12 384/206 |
| 4,862,789 A * | 9/1989 | Burgess | ................ | F04B 1/2085 384/103 |
| 5,364,682 A | 11/1994 | Tanaka et al. | | |
| 5,573,846 A | 11/1996 | Harig et al. | | |
| 5,616,406 A * | 4/1997 | Nakamaru | ............... | C08K 3/30 428/545 |
| 5,732,322 A * | 3/1998 | Nakamaru | ........... | C08K 3/0008 428/550 |
| 5,971,617 A | 10/1999 | Woelki et al. | | |
| 6,148,491 A * | 11/2000 | Bartocci | ................ | B32B 3/266 156/309.6 |
| 6,199,942 B1 * | 3/2001 | Carroll, III | .......... | B60N 2/4249 188/377 |
| 6,548,188 B1 | 4/2003 | Yanase et al. | | |
| 6,591,706 B2 | 7/2003 | Harer et al. | | |
| 7,118,808 B2 | 10/2006 | Woelki et al. | | |
| 8,118,492 B2 | 2/2012 | Weiden et al. | | |
| 8,984,817 B2 * | 3/2015 | Weiden | ................... | F16C 17/02 136/244 |
| 2005/0039560 A1 | 2/2005 | Degorce et al. | | |
| 2005/0079779 A1 * | 4/2005 | McLeod | ................ | B29C 43/18 442/6 |
| 2005/0250398 A1 * | 11/2005 | Patel | ....................... | B32B 27/12 442/40 |
| 2010/0047612 A1 * | 2/2010 | Kugo | ........................ | B22F 7/08 428/613 |
| 2010/0098360 A1 | 4/2010 | Schmitjes et al. | | |
| 2010/0296896 A1 | 11/2010 | Kosty | | |
| 2011/0176757 A1 | 7/2011 | Heldmann et al. | | |
| 2012/0240350 A1 * | 9/2012 | Natu | ................... | E05D 11/0081 16/2.2 |
| 2014/0044385 A1 * | 2/2014 | Andelkovski | ........... | B32B 15/08 384/276 |
| 2014/0153852 A1 | 6/2014 | Long et al. | | |
| 2015/0093066 A1 * | 4/2015 | Speicher | ................... | B32B 7/12 384/625 |

FOREIGN PATENT DOCUMENTS

| | | |
|---|---|---|
| EP | 1132632 A2 | 9/2001 |
| EP | 1508708 A1 | 2/2005 |
| EP | 2218929 A2 | 8/2010 |
| EP | 2743521 A1 | 6/2014 |
| JP | S484411 U | 1/1973 |
| JP | S61211525 A | 9/1986 |
| JP | H09210053 A | 8/1997 |
| JP | H1037963 A | 2/1998 |
| JP | 2001511502 A | 8/2001 |
| JP | 2007032584 A | 2/2007 |
| JP | 2008291927 A | 12/2008 |
| JP | 2013052675 A | 3/2013 |
| KR | 101457178 B1 | 11/2014 |
| WO | 9905425 A1 | 2/1999 |
| WO | 2007128643 A2 | 11/2007 |
| WO | 2013110110 A1 | 8/2013 |

OTHER PUBLICATIONS

International Search Report for PCT/EP2015/080474 dated Mar. 7, 2016, 2 pages.

* cited by examiner

SLIDING COMPONENT AND METHOD OF FORMING THE SAME

CROSS-REFERENCE TO RELATED APPLICATION(S)

This application claims priority under 35 U.S.C. § 119(e) to U.S. Patent Application No. 62/094,467 entitled "SLIDING COMPONENT AND METHOD OF FORMING THE SAME," by Juergen Hartmann, et al., filed Dec. 19, 2014, which is assigned to the current assignee hereof and incorporated herein by reference in its entirety.

FIELD OF THE DISCLOSURE

The present disclosure relates to sliding components, and more particularly to sliding components including an intermediate component having undercut portions.

RELATED ART

Plain bearings generally include a sliding layer supported by a rigid component. In certain applications, such as in high speed or high stress operations, traditional plain bearings can peel or fail. Failure can occur at or along an interface formed between the sliding layer and the rigid component. Attempts to cure this deficiency are currently inadequate.

The industry continues to demand improved bearings and bearing components.

BRIEF DESCRIPTION OF THE DRAWINGS

Embodiments are illustrated by way of example and are not intended to be limited in the accompanying figures.

DETAILED DESCRIPTION

The following description in combination with the figures is provided to assist in understanding the teachings disclosed herein. The following discussion will focus on specific implementations and embodiments of the teachings. This focus is provided to assist in describing the teachings and should not be interpreted as a limitation on the scope or applicability of the teachings. However, other embodiments can be used based on the teachings as disclosed.

The terms "comprises," "comprising," "includes," "including," "has," "having" or any other variation thereof, are intended to cover a non-exclusive inclusion. For example, a method, article, or apparatus that comprises a list of features is not necessarily limited only to those features but may include other features not expressly listed or inherent to such method, article, or apparatus. Further, unless expressly stated to the contrary, "or" refers to an inclusive-or and not to an exclusive-or. For example, a condition A or B is satisfied by any one of the following: A is true (or present) and B is false (or not present), A is false (or not present) and B is true (or present), and both A and B are true (or present).

Also, the use of "a" or "an" is employed to describe elements and components described herein. This is done merely for convenience and to give a general sense of the scope of the invention. This description should be read to include one, at least one, or the singular as also including the plural, or vice versa, unless it is clear that it is meant otherwise. For example, when a single item is described herein, more than one item may be used in place of a single item. Similarly, where more than one item is described herein, a single item may be substituted for that more than one item.

Unless otherwise defined, all technical and scientific terms used herein have the same meaning as commonly understood by one of ordinary skill in the art to which this invention belongs. The materials, methods, and examples are illustrative only and not intended to be limiting. To the extent not described herein, many details regarding specific materials and processing acts are conventional and may be found in textbooks and other sources within the sliding component arts.

Figure 1:
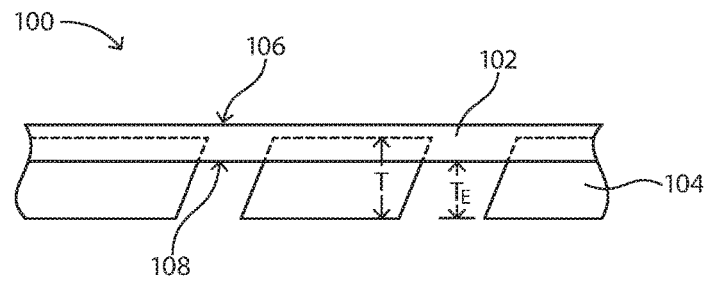
FIG. 1 includes a simplified side view of a sliding component in accordance with an embodiment.

Referring to FIG. 1, a sliding component 100 can generally include a sliding layer 102 and an intermediate component 104 having at least one undercut portion as discussed in greater detail below.

The sliding layer 102 may include a sheet of material having a major surface 106 and a major surface 108. The first and second major surfaces 106 and 108 can be spaced apart by a thickness. In an embodiment, the thickness of the sliding layer 102 at a first location along the sheet can be equal to a thickness of the sliding layer 102 at a second location along the sheet. In a more particular embodiment, the major surface 106 can lie along a first plane and the major surface 108 can lie along a second plane; the first and second planes not intersecting at any location therealong.

In another embodiment, the sliding layer 102 can have a nonuniform thickness, i.e., a thickness of the sliding layer 102 at a first location is different from a thickness of the sliding layer 102 at a second location.

At least one of the major surfaces 106 and 108 can be planar or relatively smooth prior to engagement with the intermediate component 104. As discussed in greater detail below, the major surface 106 may be planar or relatively smooth even after engagement with the intermediate component 104.

In an embodiment, the sliding layer 102 can be continuous, i.e., the sliding layer 102 is devoid of perceptible apertures or openings extending therethrough. In such a manner, a liquid applied to the sliding layer along one of the major surfaces 106 or 108 will not penetrate through the thickness thereof to the other of the major surfaces 106 or 108. Skilled artisans will recognize that inherent material porosity resulting from the manufacturing process does not rise to the level of an aperture or opening, unless the porosity is large enough so as to permit permeability of a fluid, such as water, therethrough.

The sliding layer 102 may comprise a monolithic construction. In an embodiment, the sliding layer 102 may have an approximately homogenous composition, i.e., the sliding layer 102 essentially includes a single material. In a further embodiment, the sliding layer 102 may have a homogenous composition.

The sliding layer 102 can comprise a low friction material. For example, the sliding layer 102 may include a polymer, such as a fluoropolymer. Exemplary materials include, for example, polytetrafluoroethylene (PTFE), fluorinated ethylene-propylene (FEP), polyvinylidenfluoride (PVDF), polychlorotrifluoroethylene (PCTFE), ethylene chlorotrifluoroethylene (ECTFE), perfluoroalkoxypolymer, polyacetal, polybutylene terephthalate, polyimide, polyetherimide, polyetheretherketone (PEEK), polyethylene, polysulfone, polyamide, polyphenylene oxide, polyphenylene sulfide (PPS), polyurethane, polyester, or any combination thereof.

In a particular embodiment, the sliding layer 102 may be impregnated or saturated with a filler. Exemplary fillers include glass fibers, carbon fibers, silicon, PEEK, aromatic polyester, carbon particles, bronze, fluoropolymers, thermoplastic fillers, aluminum oxide, polyamidimide (PAI), PPS, polyphenylene sulfone ($PPSO_2$), liquid crystal polymers (LCP), aromatic polyesters, molybdenum disulfide, tungsten disulfide, graphite, graphene, expanded graphite, boron nitrade, talc, calcium fluoride, or any combination thereof. Additionally, the filler can include alumina, silica, titanium dioxide, calcium fluoride, boron nitride, mica, Wollastonite, silicon carbide, silicon nitride, zirconia, carbon black, pigments, or any combination thereof.

In a non-illustrated embodiment, the sliding layer may further include an at least partially encapsulated layer of material disposed between the major surfaces. For example, the sliding layer may include a thin sheet or woven mesh fully encapsulated therein. The at least partially encapsulated layer of material may enhance rigidity of the sliding layer.

The intermediate component 104 can be coupled to the sliding layer 102 at a location adjacent to the major surface 108. In an embodiment, the intermediate component 104 may be partially embedded into the sliding layer 102. In another embodiment, the intermediate component 104 may be attached to the sliding layer 102 by an adhesive (not illustrated). In yet a further embodiment, the intermediate component 104 may be partially embedded into the sliding layer 102 and adhered thereto.

In an embodiment, the adhesive layer can be a hot melt adhesive. Examples of suitable adhesives include fluoropolymers, epoxy resins, polyimide resins, polyether/polyamide copolymers, ethylene vinyl acetates, ethylene tetrafluoroethylene (ETFE), ETFE copolymer, perfluoroalkoxy (PFA), or any combination thereof. Additionally, the adhesive can include at least one functional group selected from —C=O, —C—O—R, —COH, —COOH, —COOR, —$CF_2$=CF—OR, or any combination thereof, where R is a cyclic or linear organic group containing between 1 and 20 carbon atoms. Additionally, the adhesive can include a copolymer. In an embodiment, the hot melt adhesive can have a melting temperature of not greater than 250° C., such as not greater than 220° C. In another embodiment, the adhesive may break down above 200° C., such as above 220° C. In further embodiments, the melting temperature of the hot melt adhesive can be higher than 250° C., even higher than 300° C.

The intermediate component 104 can have an exposed thickness, $T_E$, less than a total thickness, T, thereof. For example, $T_E$ can be less than 0.9 T, such as less than 0.85 T, less than 0.8 T, less than 0.75 T, less than 0.7 T, less than 0.65 T, less than 0.6 T, less than 0.55 T, less than 0.5 T, less than 0.45 T, less than 0.4 T, less than 0.35 T, or even less than 0.3 T. In an embodiment, $T_E$ can be at least 0.01 T, such as at least 0.05 T, at least 0.1 T, at least 0.15 T, at least 0.2 T, or even at least 0.25 T. In a particular embodiment, $T_E$ may be between 0.25 T and 0.75 T. In such a manner, the intermediate component 104 can be embedded within the sliding layer 102.

The intermediate component 104 may extend into the sliding layer 102 a distance that is less than a thickness of the sliding layer 102. For example, the intermediate component 104 can extend into the sliding layer at least 1% of a thickness thereof, such as at least 2% the thickness thereof, at least 3% the thickness thereof, at least 4% the thickness thereof, at least 5% the thickness thereof, at least 6% the thickness thereof, at least 7% the thickness thereof, at least 8% the thickness thereof, at least 9% the thickness thereof, at least 10% the thickness thereof, at least 15% the thickness thereof, or even at least 20% the thickness thereof. In an embodiment, the intermediate component 104 may extend into the sliding layer 102 no greater than 95% of the thickness thereof, such as no greater than 90% the thickness thereof, no greater than 85% the thickness thereof, no greater than 80% the thickness thereof, no greater than 75% the thickness thereof, no greater than 70% the thickness thereof, no greater than 65% the thickness thereof, no greater than 60% the thickness thereof, no greater than 55% the thickness thereof, no greater than 50% the thickness thereof, no greater than 45% the thickness thereof, no greater than 40% the thickness thereof, no greater than 35% the thickness thereof, or even no greater than 30% the thickness thereof.

In an embodiment, the intermediate component 104 may extend into the sliding layer 102 a distance within a range of 20% of the thickness of the sliding layer 102 and 75% of the thickness of the sliding layer 102.

In an embodiment, the intermediate component 104 includes a material having a higher rigidity as compared to the sliding layer 102. In another embodiment, the intermediate component 104 may include a metal or rigid polymer. In a particular embodiment, the intermediate component 104 includes a metal. Exemplary metals include carbon steel, spring steel, and the like, iron, aluminum, zinc, copper, magnesium, or any combination thereof. In a particular embodiment, the intermediate component 104 can be a metal (including metal alloys), such as ferrous alloys.

In a particular embodiment, the intermediate component 104 may comprise a material having a low yield strength. For example, the intermediate component 104 may comprise a material having a yield strength of no greater than 500 MPa, such as no greater than 475 MPa, no greater than 450 MPa, no greater than 425 MPa, no greater than 400 MPa, no greater than 375 MPa, no greater than 350 MPa, no greater than 325 MPa, no greater than 300 MPa, no greater than 275 MPa, no greater than 250 MPa, no greater than 225 MPa, no greater than 200 MPa, no greater than 175 MPa, no greater than 150 MPa, no greater than 125 MPa, no greater than 100 MPa, or even no greater than 75 MPa. In an embodiment, the intermediate component 104 may comprise a material having a yield strength of at least 5 MPa, such as at least 10 MPa, at least 15 MPa, at least 20 MPa, at least 25 MPa, at least 30 MPa, at least 35 MPa, at least 40 MPa, at least 45 MPa, at least 50 MPa, or even at least 55 MPa. Low yield strength as described above may be desirable in particular embodiments as active deformation of a material having a high yield strength during lamination processes, as described below, may result in residual stresses in a finished laminated product. These residual stresses may manifest in delamination or breakage issues over extended usage. To the contrary, lower yield strength manifests in increased plastic deformation and decreased elastic deformation during lamination, thereby reducing the tendency of the intermediate component 104 to spring-back to the pre-laminated state.

In certain embodiments, the intermediate component 104 may have a bi-material construction. In a more particular embodiment, the intermediate component 104 may be bi-metallic.

radiation cured epoxy, or an air cured epoxy. Further, the epoxy resin can include polyglycidylether, diglycidylether, bisphenol A, bisphenol F, oxirane, oxacyclopropane, ethylenoxide, 1,2-epoxypropane, 2-methyloxirane, 9,10-epoxy-9,10-dihydroanthracene, or any combination thereof. The epoxy resin can include synthetic resin modified epoxies based on phenolic resins, urea resins, melamine resins, benzoguanamine with formaldehyde, or any combination thereof. By way of example, epoxies can include

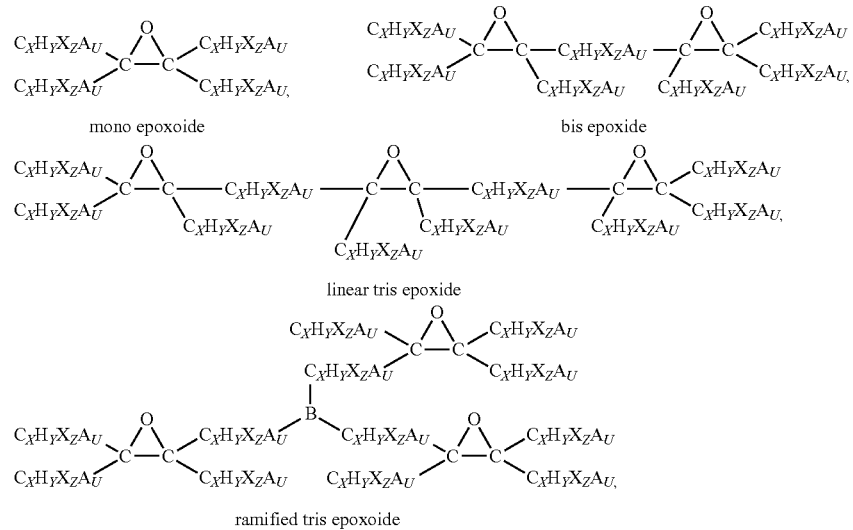

In particular embodiments, the intermediate component 104 may be coated with one or more temporary corrosion protection layers to prevent corrosion thereof prior to processing. Each of the layers can have a thickness in a range of 1 micron and 50 microns, such as in a range of 7 microns and 15 microns. The layers can include a phosphate of zinc, iron, manganese, or any combination thereof. Additionally, the layers can be a nano-ceramic layer. Further, layers can include functional silanes, nano-scaled silane based primers, hydrolyzed silanes, organosilane adhesion promoters, solvent/water based silane primers, chlorinated polyolefins, passivated surfaces, commercially available zinc (mechanical/galvanic) or zinc-nickel coatings, or any combination thereof. Temporary corrosion protection layers can be removed or retained during processing.

In particular embodiments, the intermediate component 104 may further include a permanent corrosion resistant coating. The corrosion resistant coating can have a thickness of in a range of 1 micron and 50 microns, such as in a range of 5 microns and 20 microns, or even in a range of 7 microns and 15 microns. The corrosion resistant coating can include an adhesion promoter layer and an epoxy layer. The adhesion promoter layer can include a phosphate of zinc, iron, manganese, tin, or any combination thereof. Additionally, the adhesion promoter layer can be nano-ceramic layer. The adhesion promoter layer can include functional silanes, nano-scaled silane based layers, hydrolyzed silanes, organosilane adhesion promoters, solvent/water based silane primers, chlorinated polyolefins, passivated surfaces, commercially available zinc (mechanical/galvanic) or Zinc-Nickel coatings, or any combination thereof.

The epoxy layer can be a thermal cured epoxy, a UV cured epoxy, an IR cured epoxy, an electron beam cured epoxy, a or any combination thereof, wherein $C_XH_YX_ZA_U$ is a linear or ramified saturated or unsaturated carbon chain with optionally halogen atoms $X_Z$ substituting hydrogen atoms, and optionally where atoms like nitrogen, phosphorous, boron, etc, are present and B is one of carbon, nitrogen, oxygen, phosphorous, boron, sulfur, etc.

The epoxy resin can further include a hardening agent. The hardening agent can include amines, acid anhydrides, phenol novolac hardeners such as phenol novolac poly[N-(4-hydroxyphenyl)maleimide] (PHPMI), resole phenol formaldehydes, fatty amine compounds, polycarbonic anhydrides, polyacrylate, isocyanates, encapsulated polyisocyanates, boron trifluoride amine complexes, chromic-based hardeners, polyamides, or any combination thereof. Generally, acid anhydrides can conform to the formula R—C=O—O—C=O—R' where R can be $C_XH_YX_ZA_U$ as described above. Amines can include aliphatic amines such as monoethylamine, diethylenetriamine, triethylenetetraamine, and the like, alicyclic amines, aromatic amines such as cyclic aliphatic amines, cyclo aliphatic amines, amidoamines, polyamides, dicyandiamides, imidazole derivatives, and the like, or any combination thereof. Generally, amines can be primary amines, secondary amines, or tertiary amines conforming to the formula $R_1R_2R_3N$ where R can be $C_XH_YX_ZA_U$ as described above.

In an embodiment, the epoxy layer can include fillers to improve conductivity, such as carbon fillers, carbon fibers, carbon particles, graphite, metallic fillers such as bronze, aluminum, and other metals and their alloys, metal oxide fillers, metal coated carbon fillers, metal coated polymer fillers, or any combination thereof. The conductive fillers can allow current to pass through the epoxy coating and can increase the conductivity of the coated bushing as compared to a coated bushing without conductive fillers.

In an embodiment, the epoxy layer can increase the corrosion resistance of the intermediate component 102. For example, the epoxy layer can substantially prevent corrosive elements, such as water, salts, and the like, from contacting the intermediate component 104, thereby inhibiting chemical corrosion thereof. Additionally, the epoxy layer can inhibit galvanic corrosion of the intermediate component 104 by preventing contact between dissimilar metals. For example, placing an aluminum intermediate component 104 without the epoxy layer against a magnesium material can cause the magnesium to oxidize. However, the epoxy layer can prevent the aluminum intermediate component from contacting the magnesium housing and inhibit corrosion due to a galvanic reaction.

Application of the corrosion resistant layer can include applying an epoxy coating. The epoxy can be a two-component epoxy or a single component epoxy. Advantageously, a single component epoxy can have a longer working life. The working life can be the amount of time from preparing the epoxy until the epoxy can no longer be applied as a coating. For example, a single component epoxy can have a working life of months compared to a working life of a two-component epoxy of a few hours.

In an embodiment, the epoxy layer can be applied by spray coating, e-coating, dip spin coating, electrostatic coating, flow coating, roll coating, knife coating, coil coating, or the like. Additionally, the epoxy layer can be cured, such as by thermal curing, UV curing, IR curing, electron beam curing, irradiation curing, or any combination thereof. Preferably, the curing can be accomplished without increasing the temperature of the component above the breakdown temperature of any of the sliding layer, the adhesive layer, the woven mesh, or the adhesion promoter layer. Accordingly, the epoxy may be cured below about 250° C., even below about 200° C.

Preferably, the corrosion resistant coating, and particularly the epoxy layer, can be applied to cover the exposed edges of the intermediate component 104. E-coating and electrostatic coating can be particularly useful in applying the corrosion resistant coating layers to all exposed metallic surfaces without coating the non-conducting sliding layer. Further, it is preferable for the corrosion resistant coating to continuously cover the exposed surfaces of the intermediate component 104 without cracks or voids. The continuous, conformal covering of the intermediate component 104 can substantially prevent corrosive elements such as salts and water from contacting the intermediate component 104. In an embodiment, the intermediate component 104 with such a corrosion resistant coating can have a significantly increased lifetime, and in particular, the intermediate component can have a Corrosion Resistance Rating of at least about 120 hours, such as at least about 168 hours, such as at least about 240 hours, even at least about 288 hours. A Corrosion Resistance Rating is determined according to the neutral salt spray test defined by ISO 9227:2006 "Corrosion tests in artificial atmospheres—salt spray tests", Second Edition published Jul. 15, 2007. Generally, a test intermediate component is placed in a salt spray chamber and subjected to a spray of salt until at least 10% of the surface is covered by iron rust.

In an alternate embodiment, the corrosion resistance layer can be applied at any point during the processing of the intermediate component, including before applying the sliding layer or after applying the sliding layer.

Figure 2:
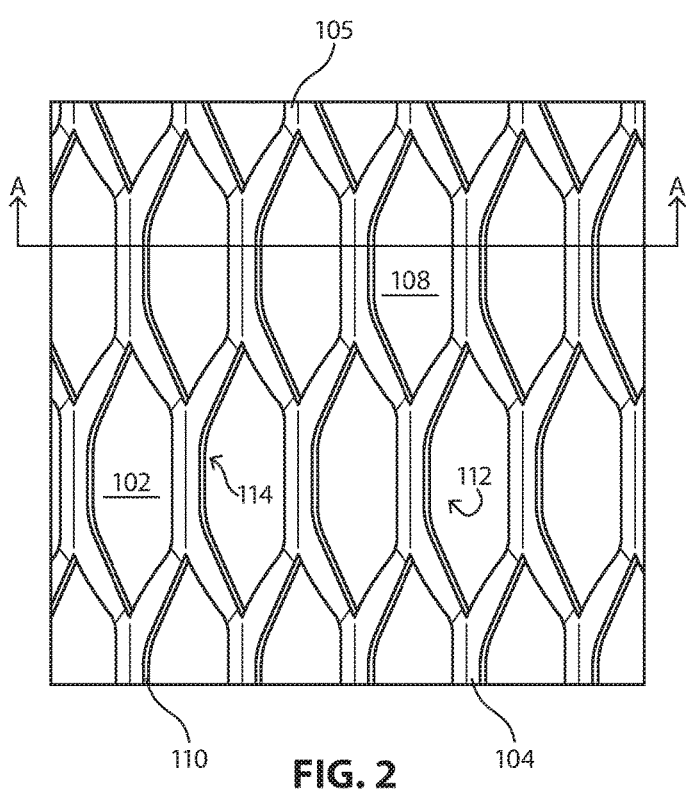
FIG. 2 includes a bottom view of a sliding component in accordance with an embodiment.

In an embodiment, such as illustrated in FIG. 2, the intermediate component 104 is an expanded mesh 105 including a plurality of interconnected strands 110. The strands 110 can define at least one aperture 112 including at least one undercut portion 114. In a more particular embodiment, the plurality of strands 110 can define a plurality of apertures 122, all of which can include at least one undercut portion 114.

Figure 3:
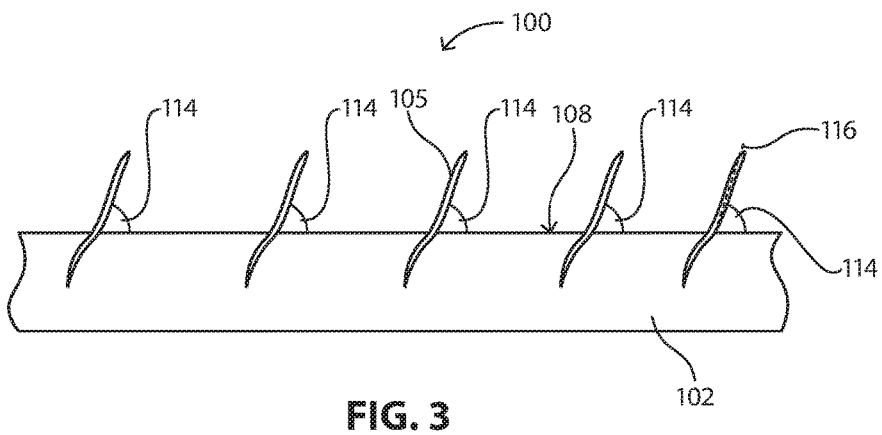
FIG. 3 includes a cross-sectional side view of the sliding component in accordance with an embodiment, as seen along Line A-A in FIG. 2.

FIG. 3 illustrates a cross-sectional side view of the sliding component 100. Undercut portions 114 are measured with respect to the second major surface 108 of the sliding layer 102. In an embodiment, at least one of the undercut portions 114 has an angle less than 90°, such as less than 85°, less than 80°, less than 75°, less than 70°, less than 65°, less than 60°, less than 55°, less than 50°, or even less than 45°. In another embodiment, the undercut portions 114 have angles of at least 1°, such as at least 2°, at least 3°, at least 4°, at least 5°, at least 6°, at least 7°, at least 8°, at least 9°, at least 10°, at least 15°, at least 20°, at least 25°, at least 30°, at least 35°, or even at least 40°.

In an embodiment, at least one of the undercut portions 114 can have an angle in a range of 1° and 90°, such as in a range of 5° and 85°, in a range of 10° and 80°, in a range of 15° and 75°, in a range of 20° and 70°, in a range of 25° and 65°, in a range of 30° and 60°, in a range of 35° and 55°, or even in a range of 40° and 50°.

For expanded mesh 105 having non-linear cross sectional profiles, e.g., expanded mesh having ellipsoidal or polygonal shapes when viewed in cross-section, the angle of the undercut portion 114 can be measured between the second major surface 108 of the sliding layer 102 and a best fit line 116 of an outer surface of the expanded mesh 105 as measured along the portion of the expanded mesh extending from the major surface 108 of the sliding layer 102.

In a particular embodiment, at least two apertures 112 of the expanded mesh 105 can have the same, or substantially the same, angled undercut portion 114. In a more particular embodiment, all undercut portions 114 in the expanded mesh 105 can have the same, or substantially the same, angle. As used herein, "substantially the same angle" refers to a deviation between angled undercut portions 114 of no greater than 5°, such as no greater than 4°, no greater than 3°, no greater than 2°, or even no greater than 1°.

In another embodiment, at least two of the undercut portions 114 can have different angles. For example, a first undercut portion 114 can have a first angle different from an angle of a second undercut portion 114.

Expanded mesh 105 may be manufactured by several different processes. Prior to shaping, the expanded mesh may be a sheet of material. The sheet of material may have a uniform thickness defining opposing major surfaces. The sheet of material may be continuous, e.g., devoid of holes or openings therethrough.

As understood by skilled artisans, the sheet of material may be shaped by at least one of several methods. For example, a plurality of apertures may be stamped into the sheet. Stamping may either involve material removal or the creation of slits within the sheet without significant material removal. In an embodiment, the apertures may be equally spaced apart from one another. In another embodiment, the apertures may be spaced apart from one another at different spatial intervals.

In certain embodiments, the sheet may be expanded, or stretched, during stamping. For example, a serrated press may reciprocate between open and closed positions, forming the apertures and simultaneously creating an undulating surface profile of the sheet. Alternatively, the sheet may be stamped to form the apertures in a first step and then be expanded in a second step. Expansion of the sheet can occur in a single direction or in a bi- or other multi-directional manner. For example, in an embodiment, the sheet may be expanded in opposing directions, e.g., a first direction and a second direction offset from the first direction by 180°. In another embodiment, the sheet may be bi-directionally expanded, e.g., expanded in a first, second, third, and fourth directions. The first and third directions may be opposite one another and the second and fourth directions may be opposite one another. More particularly, each of the first and third directions may be offset by 90° from each of the second and fourth directions.

After formation, the expanded mesh 105 can have an average density, e.g., a density as measured over 1 square meter (m²), less than an average density of the sheet prior to expanding as measured over the same area, e.g., a density as measured over 1 m². In this regard, the expanded mesh may have a density $D_{EM}$ that is less than 100% of a density of the sheet, $D_S$, as measured prior to expanding. For example, $D_{EM}$ can be less than 0.99 $D_S$, such as less than 0.98 $D_S$, less than 0.97 $D_S$, less than 0.96 $D_S$, less than 0.95 $D_S$, less than 0.9 $D_S$, less than 0.85 $D_S$, less than 0.8 $D_S$, less than 0.75 $D_S$, less than 0.7 $D_S$, less than 0.65 $D_S$, less than 0.6 $D_S$, less than 0.55 $D_S$, less than 0.5 $D_S$, less than 0.45 $D_S$, or even less than 0.4 $D_S$. In an embodiment, $D_{EM}$ can be at least 0.01 $D_S$, such as at least 0.1 $D_S$, at least 0.2 $D_S$, or even at least 0.3 $D_S$.

In a particular embodiment, $D_{EM}$ can be in a range of 0.4 $D_S$ and 0.8 $D_S$. Even more particularly, $D_{EM}$ can be in a range of 0.5 $D_S$ and 0.7 $D_S$. Having a $D_{EM}$ less than $D_S$ can result in the expanded mesh having a reduced weight as compared to a non-expanded sheet. This may reduce the weight of the sliding component 100.

In an embodiment, the expanded mesh 105 can have a thickness that is at least 101% a thickness of the pre-expanded mesh, such as at least 101% the thickness of the pre-expanded mesh, at least 102% the thickness of the pre-expanded mesh, at least 103% the thickness of the pre-expanded mesh, at least 104% the thickness of the pre-expanded mesh, at least 105% the thickness of the pre-expanded mesh, at least 110% the thickness of the pre-expanded mesh, at least 115% the thickness of the pre-expanded mesh, at least 120% the thickness of the pre-expanded mesh, at least 125% the thickness of the pre-expanded mesh, at least 130% the thickness of the pre-expanded mesh, at least 135% the thickness of the pre-expanded mesh, at least 140% the thickness of the pre-expanded mesh, at least 145% the thickness of the pre-expanded mesh, at least 150% the thickness of the pre-expanded mesh, at least 160% the thickness of the pre-expanded mesh, at least 170% the thickness of the pre-expanded mesh, at least 180% the thickness of the pre-expanded mesh, at least 190% the thickness of the pre-expanded mesh, or even at least 200% the thickness of the pre-expanded mesh. In a further embodiment, the thickness of the expanded mesh 105 can be no greater than 1000% the thickness of the thickness of the pre-expanded mesh, such as no greater than 900% the thickness of the pre-expanded mesh, no greater than 800% the thickness of the pre-expanded mesh, no greater than 700% the thickness of the pre-expanded mesh, no greater than 600% the thickness of the pre-expanded mesh, or even no greater than 500% the thickness of the pre-expanded mesh.

Referring again to FIG. 2, in an embodiment, the apertures 112 are trapezoidal when viewed normal to a plane formed by the expanded mesh 105. In other embodiments, the apertures 112 may have other polygonal shapes. For example, the apertures 112 may have a shape, when viewed normal to the plane formed by the stretched mesh, selected from the following shapes: a triangle, a quadrilateral, a pentagon, a hexagon, a heptagon, an octagon, a nonagon, a decagon, a hendecagon, or a dodecagon.

In an embodiment, the apertures may be ellipsoidal when viewed normal to the plane formed by the stretched mesh. For example, the apertures may be ovular or circular.

Figure 4:
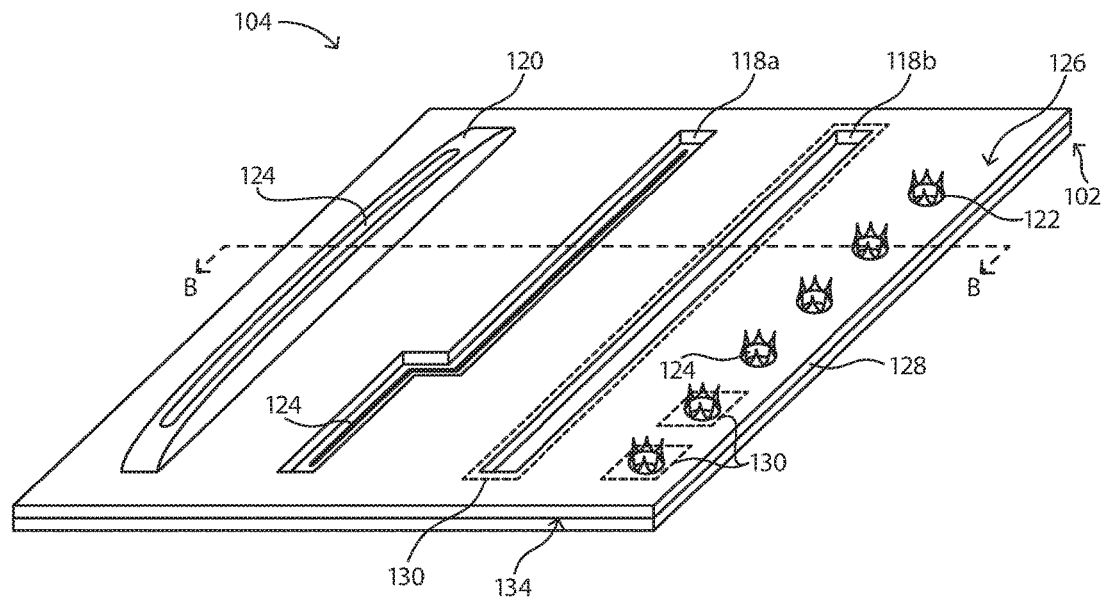
FIG. 4 includes a top perspective view of a sliding component in accordance with an alternate embodiment.

Referring now to FIG. 4, in another embodiment, the intermediate component 104 includes a sheet 128 having at least one textured portion 130. In an embodiment, the textured portions 130 may be evenly or symmetrically spaced apart along the sheet 128. In another embodiment, the textured portions 130 may have varying spacing and intervals therebetween.

By way of a non-limiting example, the textured portion 130 can include any one of a recess 118, projection 120, or deformation 122 disposed along a (first) surface 126 of the sheet 128. The recesses 118, projections 120, and deformations 122 can further include one or more apertures 124 extending at least partially through the thickness of the sheet 128. In an embodiment, the apertures 124 may fully extend through the thickness of the sheet 128.

In an embodiment, the textured portions 130 may include all recesses 118. In another embodiment, the textured portions 130 may include all projections 120. In a further embodiment, the textured portions 130 may include all deformations 122. In yet a further embodiment, the textured portions 130 may include a combination of recesses, projections, and deformations 118, 120 and 122.

In an embodiment, at least one recess 118a can extend along the surface 126 in a non-linear manner. The recess 118a may include one or more portions offset by a relative angle therebetween. In a further embodiment, at least one recess 118b can extend along the surface 126 in a linear manner. Similarly, the projections 120 may extend along the surface 126 in a linear or non-linear manner. Skilled artisans will recognize after reading the entire disclosure contained herein that additional shapes and structures may also be possible.

Figure 5:
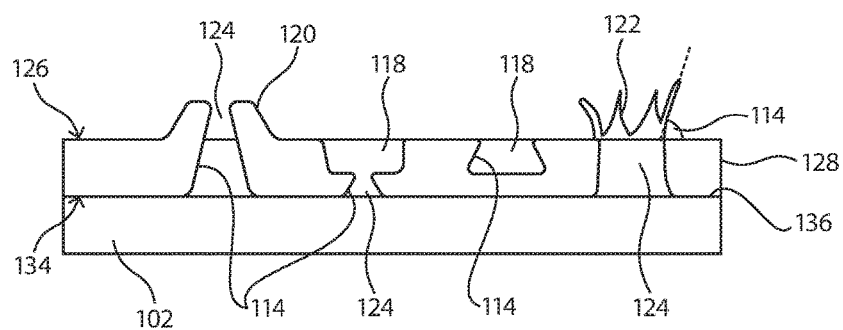
FIG. 5 includes a cross-sectional side view of the sliding component in accordance with an embodiment, as seen along Line B-B in FIG. 4.

The textured portions 130 may have undercut portions 132 similar to the undercut portions 114. FIG. 5 illustrates a cross-sectional side view of exemplary undercut portions 132. As illustrated, the undercut portions 132 may extend partly or wholly through the thickness of the sheet 128. Skilled artisans will recognize after reading the entire disclosure contained herein that additional shapes and arrangements of the undercut portions 132 may also be possible.

The textured portions 130 may be formed by a mechanical process, such as punching, sanding, sawing, scraping, or ablating; or by a chemical process such as pickling or etching. In an embodiment, all of the textured portions 130 can be formed in a similar manner. In another embodiment, at least two of the textured portions 130 can be formed by different processes.

As illustrated in FIGS. 4 and 5, a surface 134 of the sheet 128 may be coupled to the sliding layer 102 along a contact interface 136 formed therebetween. In an embodiment, the sheet 128 may be coupled directly to the sliding layer 102. An adhesive may be disposed along at least a portion of the contact interface 136. The adhesive may be disposed along the entire contact interface 136. One or more adhesion promoting layers may be disposed between at least one of the sheet 128 or sliding layer 102 and the adhesive.

In another embodiment, the intermediate component 104 can include a porous structure such as a porous metal strip or a foam structure having a solid material and a volume of gas-filled pores. Exemplary foam structures include metal foam, such as copper foam, aluminum foam, and steel foam; polymer foam; and ceramic foam. The gas-filled pores can be sealed, creating a closed-cell foam, or interconnected, creating an open-cell foam. An outer surface of the foam structure can have exposed pores, or recesses, which create back angles, as described above, for engaging with the sliding layer 102. In an embodiment, between 25% and 95% of a volume of the foam structure is void. In a more particular embodiment, at least 30% of the volume may be void, such as at least 35% of the volume may be void, at least 40% of the volume may be void, at least 45% of the volume may be void, at least 50% of the volume may be void, at least 55% of the volume may be void, at least 60% of the volume may be void, at least 65% of the volume may be void, or even at least 70% of the volume may be void. In a further embodiment, no greater than 94% of the volume may be void, such as no greater than 93% of the volume may be void, no greater than 92% of the volume may be void, no greater than 91% of the volume may be void, no greater than 90% of the volume may be void, no greater than 85% of the volume may be void, no greater than 80% of the volume may be void, or even no greater than 75% of the volume may be void.

In accordance with embodiments described herein, upon assembly of the intermediate component with the sliding layer, the sliding component can include a sliding surface on a first side and an engagement surface on an opposing side. The sliding surface may have a low friction characteristic while the engagement surface may provide an interface to anchor with a substrate or other structure. In such a manner, the sliding component may be anchored with a structure and provide a low friction surface at a suitable location therealong. By way of a non-limiting example, a worn bearing surface may be replaced by removing an existing sliding layer from a structure and attaching a sliding component as described herein. For suitable applications, the structure may be softened prior to application of the sliding component. The sliding component may be pressed against the structure, allowing the undercut portions to fill with some material of the structure. In this regard, peel resistance between the structure and the sliding component can be increased as compared to the peel resistance of the existing sliding layer relative to the structure.

Figure 6:
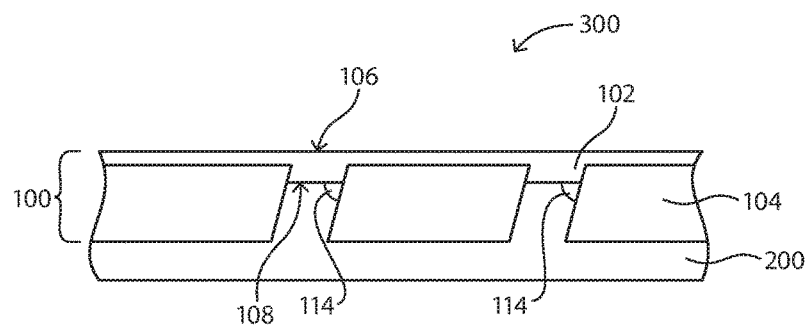
FIG. 6 includes a simplified side view of a bearing in accordance with an embodiment.

Referring now to FIG. 6, the sliding component 100 can be coupled with a substrate 200 to form a bearing 300 having an exposed sliding surface 106. As illustrated in FIG. 6, the sliding surface 106 lies along a plane.

The substrate 200 can include a polymer, metal, alloy, ceramic, or other suitable material. In a particular embodiment, the substrate 200 includes a polymer. Exemplary polymers may include polyethylene, ultra-high-molecular-weight polyethylene, polypropylene, polyether ether ketone, polyphenylene sulfide, polysulfone, liquid crystal polymer, polyphthalamide, polyamide, polybutylene terephthalate, polycarbonate, polyoxymethylene, polyimide, polyamide-imide, polyetherimide, or any combination thereof.

In an embodiment, the substrate 200 may contact the major surface 108 of the sliding layer 102 along at least a portion of the major surface 108. In a further embodiment, the substrate 200 may contact the entire major surface 108. As illustrated, the intermediate component 104 may extend into the substrate 200 so as to be partially embedded therein. In this regard, the intermediate component 104 can be partially embedded in both the sliding layer 102 and the substrate 200.

In an embodiment, the substrate 200 may be applied to the sliding component 100 by a coating technique, such as, for example, vapor deposition, spraying, plating, powder coating, or other chemical or electrochemical techniques. In a particular embodiment, the substrate 200 may be applied by a roll-to-roll coating process, including for example, extrusion coating. For example, a material may be heated to a molten or semi-molten state and extruded through a slot die onto the major surface 108 of the sliding layer 102 where the material can harden to form the substrate 200.

In another embodiment, the substrate 200 may be applied to the sliding component 100 by a molding or casting process, such as, for example, injection molding, blow molding, or pressure casting.

In yet another embodiment, the substrate 200 may be applied to the sliding component 100 by compression. In such a manner, the substrate 200 may include a sheet of material pressed, e.g., hot or cold pressed, against the sliding component 100.

The undercut portions 114 of the intermediate component 104 can form cavities into which the substrate 200 may flow during application. The cavities can be at least partially defined by the major surface 108 of the sliding layer 102 and the intermediate component 104. In an embodiment, portions of the substrate 200 caught within the cavities may increase peel resistance between the sliding layer 102 and the substrate 200. In this regard, peel resistance of a sliding component 100 coupled to a substrate 200 in accordance with at least one of the embodiments described herein can be at least 101% greater than a peel resistance of an assembly having a substrate coupled to a sliding layer devoid of cavities, such as at least 102% greater, at least 103% greater, at least 104% greater, at least 105% greater, at least 110% greater, at least 115% greater, at least 120% greater, at least 125% greater, at least 130% greater, at least 135% greater, at least 140% greater, at least 145% greater, or even at least 150% greater.

Figure 7:
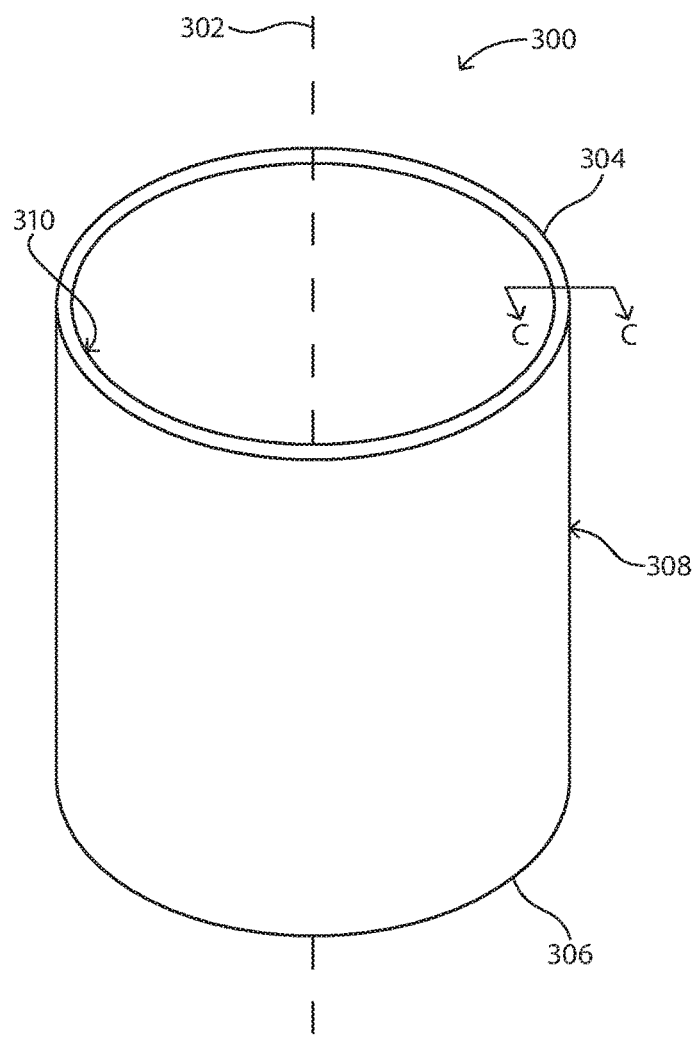
FIG. 7 includes a perspective view of a bearing in accordance with an embodiment.

FIG. 7 includes a perspective view of a bearing 300. The bearing 300 can have a generally annular body including first and second opposite axial ends 304 and 306 and a central axis 302. In an embodiment, an outer surface 308 of the bearing 300 can include the sliding layer as described above. In another embodiment, an inner surface 310 of the bearing 300 can include the sliding layer as described above.

Figure 8:
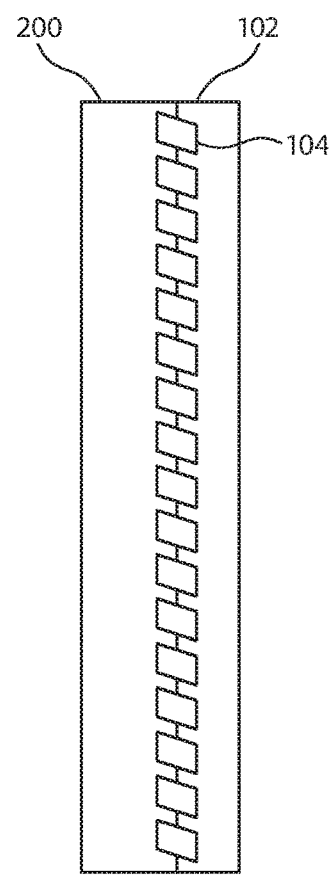
FIG. 8 includes a cross-sectional view of a sidewall of the bearing in accordance with an embodiment, as seen along Line C-C in FIG. 7.

FIG. 8 includes a cross-sectional view of the generally annular body of bearing 300 including a sliding layer 102, intermediate component 104, and substrate 200. The intermediate component 104 may provide enhanced peel resistance as measured between the substrate 200 and the sliding layer 102.

Many different aspects and embodiments are possible. Some of those aspects and embodiments are described below. After reading this specification, skilled artisans will appreciate that those aspects and embodiments are only illustrative and do not limit the scope of the present invention. Embodiments may be in accordance with any one or more of the embodiments as listed below.

Embodiment 1

A sliding component comprising:
a sliding layer; and
an intermediate component including at least one undercut portion, the intermediate component coupled to the sliding layer,
wherein the intermediate component has a thickness, T, and wherein an exposed thickness, $T_E$, of the intermediate component is less than T.

Embodiment 2

A bearing comprising:
a sliding layer;
a substrate; and an intermediate component including at least one undercut portion, the intermediate component disposed between the sliding layer and the substrate and partially embedded into each of the sliding layer and the substrate.

Embodiment 3

A bearing comprising:
an annular substrate having an inner surface and an outer surface;
a sliding layer disposed along one of the inner and outer surfaces of the annular substrate, the sliding layer defining an aperture; and
an intermediate component including at least one undercut portion, the intermediate component disposed between the annular substrate and the sliding layer, the intermediate component extending at least partially into each of the annular substrate and the sliding layer.

Embodiment 4

A method of forming a sliding component comprising:
providing an intermediate component including at least one undercut portion, the intermediate component having a thickness, T; and
coupling a sliding layer to the intermediate component, wherein the intermediate component is partially embedded into the sliding layer, and wherein an exposed thickness, $T_E$, of the intermediate component is less than T.

Embodiment 5

A method of forming a bearing comprising:
forming a sliding component by:
providing an intermediate component including at least one undercut portion; and
coupling a sliding layer to the intermediate component; and
applying a substrate to the sliding component such that the intermediate component is at least partially embedded in the substrate.

Embodiment 6

A method of engaging a sliding layer to a substrate comprising:
providing a sliding component including a sliding layer and an intermediate component partially embedded in the sliding layer, wherein the intermediate component has an exposed portion, and the exposed portion includes at least one undercut portion; and
urging the sliding component against the substrate such that the exposed portion of the intermediate component at least partially embeds within the substrate.

Embodiment 7

A method of engaging a sliding layer to a substrate comprising:
providing a sliding componing including a sliding layer having a first and a second opposite major surfaces and an intermediate component having at least one undercut portion, the intermediate component coupled to the sliding layer such that a portion of the intermediate component is exposed beyond the first major surface of the sliding layer; and
applying a substrate to the intermediate component, wherein a portion of the substrate fills at least one of the undercut portions.

Embodiment 8

The sliding component, bearing, or method according to any one of the preceding embodiments, wherein the intermediate component comprises a metal, such as a steel or an aluminum.

Embodiment 9

The sliding component, bearing, or method according to any one of the preceding embodiments, wherein the intermediate component comprises an alloy.

Embodiment 10

The sliding component, bearing, or method according to any one of the preceding embodiments, wherein at least a portion of the intermediate component further comprises a corrosion resistant coating.

Embodiment 11

The sliding component, bearing, or method according to any one of the preceding embodiments, wherein the entire intermediate component comprises a corrosion resistant coating.

Embodiment 12

The sliding component, bearing, or method according to any one of the preceding embodiments, wherein the intermediate component comprises an expanded mesh.

Embodiment 13

The sliding component, bearing, or method according to embodiment 12, wherein the expanded mesh further comprises a plurality of interconnected strands.

Embodiment 14

The sliding component, bearing, or method according to any one of embodiments 12 and 13, wherein the plurality of interconnected strands define at least one aperture extending through a thickness of the expanded mesh.

Embodiment 15

The sliding component, bearing, or method according to any one of embodiments 12-14, wherein the plurality of interconnected strands define a plurality of apertures extending through a thickness of the expanded mesh.

Embodiment 16

The sliding component, bearing, or method according to any one of embodiments 14 and 15, wherein at least a portion of the apertures have a polygonal shape when viewed along a plane extending normal thereto.

Embodiment 17

The sliding component, bearing, or method according to any one of embodiments 14-16, wherein at least a portion of the apertures have an ellipsoidal shape when viewed along a plane extending normal thereto.

Embodiment 18

The sliding component, bearing, or method according to any one of embodiments 1-11, wherein the intermediate component comprises a sheet having at least one textured portion disposed therealong.

Embodiment 19

The sliding component, bearing, or method according to any one of embodiments 1-11 and 12, wherein the intermediate component comprises a sheet having a plurality of textured portions disposed therealong.

Embodiment 20

The sliding component, bearing, or method according to any one of embodiments 18 and 19, wherein a majority of the textured portions are disposed along one major surface of the sheet.

Embodiment 21

The sliding component, bearing, or method according to any one of embodiments 18-20, wherein all of the textured portions are disposed along one major surface of the sheet.

Embodiment 22

The sliding component, bearing, or method according to any one of embodiments 18-21, wherein at least one of the textured portions includes a recess.

Embodiment 23

The sliding component, bearing, or method according to any one of embodiments 18-22, wherein at least one of the textured portions includes a projection.

Embodiment 24

The sliding component, bearing, or method according to any one of embodiments 18-23, wherein at least one of the textured portions includes a deformation.

Embodiment 25

The sliding component, bearing, or method according to any one of embodiments 18-24, wherein at least one of the textured portions further includes an aperture.

Embodiment 26

The sliding component, bearing, or method according to embodiment 25, wherein the aperture extends through a thickness of the sheet.

Embodiment 27

The sliding component, bearing, or method according to any one of embodiments 18-26, wherein the undercut portion of the intermediate component is defined by at least one of the textured portions.

Embodiment 28

The sliding component, bearing, or method according to any one of the preceding embodiments, wherein the sliding layer comprises a monolithic construction.

Embodiment 29

The sliding component, bearing, or method according to any one of the preceding embodiments, wherein the sliding layer comprises an approximately homogeneous composition.

Embodiment 30

The sliding component, bearing, or method according to any one of the preceding embodiments, wherein the sliding layer comprises a polymer, such as a fluoropolymer, such as a PTFE.

Embodiment 31

The sliding component, bearing, or method according to any one of the preceding embodiments, wherein the sliding layer has a uniform thickness.

Embodiment 32

The sliding component, bearing, or method according to any one of the preceding embodiments, wherein the sliding layer further comprises a filler.

Embodiment 33

The sliding component, bearing, or method according to any one of the preceding embodiments, wherein the intermediate component defines a thickness, T, and an exposed thickness, $T_E$, as measured by a maximum distance the intermediate component extends from the sliding layer in a direction normal thereto, and wherein $T_E$ is less than T, such as less than 0.9 T, less than 0.85 T, less than 0.8 T, less than 0.75 T, less than 0.7 T, less than 0.65 T, less than 0.6 T, less than 0.55 T, less than 0.5 T, less than 0.45 T, less than 0.4 T, less than 0.35 T, or even less than 0.3 T.

Embodiment 34

The sliding component, bearing, or method according to any one of the preceding embodiments, wherein the intermediate component defines a thickness, T, and an exposed thickness, $T_E$, as measured by a maximum distance the intermediate component extends from the sliding layer in a direction normal thereto, and wherein $T_E$ is at least 0.01 T, such as at least 0.05 T, at least 0.1 T, at least 0.15 T, at least 0.2 T, or even at least 0.25 T.

Embodiment 35

The sliding component, bearing, or method according to any one of the preceding embodiments, wherein the intermediate component comprises a plurality of apertures, each aperture defining at least one undercut portion, and wherein at least one of the undercut portions has an angle of less than 90° as measured between the undercut portion and the sliding layer, such as less than 85°, less than 80°, less than 75°, less than 70°, less than 65°, less than 60°, less than 55°, less than 50°, or even less than 45°.

Embodiment 36

The sliding component, bearing, or method according to any one of the preceding embodiments, wherein the intermediate component comprises a plurality of openings, each opening defining at least one undercut portion, and wherein at least one of the undercut portions has an angle of at least 1°, such as at least 5°, at least 10°, at least 15°, at least 20°, at least 25°, at least 30°, at least 35°, or even at least 40°.

Embodiment 37

The sliding component, bearing, or method according to any one of the preceding embodiments, wherein the intermediate component extends into the sliding layer a distance less than a thickness of the sliding layer.

Embodiment 38

The sliding component, bearing, or method according to any one of the preceding embodiments, wherein the intermediate component extends less than 75% through a thickness of the sliding layer, such as less than 60%, less than 50%, less than 40%, or even less than 30%.

Embodiment 39

The sliding component, bearing, or method according to any one of the preceding embodiments, wherein the intermediate component extends at least 1% through a thickness of the sliding layer, such as at least 2%, at least 3%, at least 4%, at least 5%, at least 10%, or even at least 20%.

Embodiment 40

The sliding component, bearing, or method according to any one of the preceding embodiments, wherein the sliding layer and intermediate component abut along a contact interface, and wherein an adhesive is disposed along at least a portion of the contact interface.

Embodiment 41

The sliding component, bearing, or method according to any one of the preceding embodiments, wherein the sliding layer and intermediate component abut along a contact interface, and wherein an adhesive is disposed along the entire contact interface.

Embodiment 42

The sliding component, bearing, or method according to any one of the preceding embodiments, further comprising an adhesion promoting layer disposed between at least a portion of the adhesive and at least one of the intermediate component and the sliding layer.

Embodiment 43

The sliding component, bearing, or method according to any one of the preceding embodiments, further comprising an adhesion promoting layer disposed between all of the adhesive and at least one of the intermediate component and the sliding layer.

Embodiment 44

The sliding component, bearing, or method according to any one of embodiments 24 and 25, wherein the adhesive comprises a polymer, such as a fluoropolymer, such as ETFE or PFA.

Embodiment 45

The sliding component, bearing, or method according to any one of the preceding embodiments, wherein the sliding layer and intermediate component are compressible by at least 0.1 mm, such as at least 0.2 mm, at least 0.3 mm, at least 0.4 mm, or even at least 0.5 mm, as measured upon application of a force of 100 N in a direction normal to the sliding layer.

Embodiment 46

The sliding component, bearing, or method according to any one of embodiments 1, 3 and 4, further comprising a substrate, wherein the intermediate component is disposed between the sliding layer and the substrate.

Embodiment 47

The sliding component, bearing, or method according to any one of embodiments 2 and 5-46, wherein the intermediate component is partially embedded in the substrate.

Embodiment 48

The sliding component, bearing, or method according to any one of embodiments 2 and 5-47, wherein the substrate comprises a rigid material.

Embodiment 49

The sliding component, bearing, or method according to any one of embodiments 2 and 5-48, wherein the substrate comprises a polymer.

Embodiment 50

The sliding component, bearing, or method according to any one of embodiments 2 and 5-49, wherein the substrate comprises a metal or an alloy.

Embodiment 51

The sliding component, bearing, or method according to any one of embodiments 2 and 5-50, wherein the substrate is coupled to the intermediate component such that a portion of the substrate flows beneath at least one of the undercut portions.

Embodiment 52

The sliding component, bearing, or method according to any one of embodiments 2 and 5-51, wherein application of the substrate is performed at an elevated temperature, such as at least 50° C., at least 75° C., or even at least 100° C.

Embodiment 53

The sliding component, bearing, or method according to any one of embodiments 2 and 5-52, wherein applying the substrate is performed at least partially by laminating.

Embodiment 54

The sliding component, bearing, or method according to any one of embodiments 2 and 5-53, wherein applying the substrate is performed at least partially by calendaring.

Embodiment 55

The sliding component, bearing, or method according to any one of embodiments 2 and 5-54, wherein applying the substrate is performed at least partially by molding.

Embodiment 56

The sliding component, bearing, or method according to any one of embodiments 2 and 5-55, wherein applying the substrate further comprises:
increasing a plasticity of the substrate.

Embodiment 57

The sliding component, bearing, or method according to embodiment 56, wherein the step of increasing the plasticity of the substrate is performed prior to urging the sliding layer against the substrate.

Embodiment 58

The sliding component, bearing, or method according to any one of embodiments 56 and 57, wherein the step of increasing the plasticity of the substrate is performed by applying a heat thereto.

Embodiment 59

The sliding component, bearing, or method according to any one of embodiments 56-58, wherein applying the substrate further comprises:
reducing the plasticity of the substrate.

Embodiment 60

The sliding component, bearing, or method according to embodiment 59, wherein the step of reducing the plasticity of the substrate is performed after increasing the plasticity thereof.

Embodiment 61

The sliding component, bearing, or method according to any one of embodiments 59 and 60, wherein the step of reducing the plasticity of the substrate is performed by exposing the substrate to a temperature less than 200° C., such as less than 150° C., less than 100° C., less than 50° C., or even less than 30° C.

Embodiment 62

The sliding component, bearing, or method according to any one of embodiments 2 and 5-61, wherein a force necessary to attach the substrate to the intermediate component is no greater than 5000 N/mm, such as no greater than 2000 N/mm, no greater than 1000 N/mm, no greater than 500 N/mm, no greater than 250 N/mm, no greater than 100 N/mm, or even no greater than 50 N/mm.

Embodiment 63

The sliding component, bearing, or method according to any one of embodiments 2 and 5-62, wherein a force necessary to attach the substrate to the intermediate component is at least 0.5 N/mm, such as at least 1 N/mm, at least 2 N/mm, at least 3 N/mm, at least 4 N/mm, at least 5 N/mm, at least 10 N/mm, or even at least 25 N/mm.

Embodiment 64

The sliding component, bearing, or method according to any one of the preceding embodiments, wherein the intermediate component at least partially comprises a foam structure.

Embodiment 65

The sliding component, bearing, or method according to embodiment 64, wherein the foam structure is a closed-cell foam.

Embodiment 66

The sliding component, bearing, or method according to embodiment 64, wherein the foam structure is an open-cell foam.

Embodiment 67

The sliding component, bearing, or method according to any one of embodiments 64-66, wherein the foam at least partially comprises an aluminum or steel.

Embodiment 68

The sliding component, bearing, or method according to any one of embodiments 64-67, wherein between 25% and 95% of a volume of the intermediate component is void.

Note that not all of the features described above are required, that a portion of a specific feature may not be required, and that one or more features may be provided in addition to those described. Still further, the order in which features are described is not necessarily the order in which the features are installed.

Certain features are, for clarity, described herein in the context of separate embodiments, may also be provided in combination in a single embodiment. Conversely, various features that are, for brevity, described in the context of a single embodiment, may also be provided separately or in any subcombinations.

Benefits, other advantages, and solutions to problems have been described above with regard to specific embodiments, However, the benefits, advantages, solutions to problems, and any feature(s) that may cause any benefit, advantage, or solution to occur or become more pronounced are not to be construed as a critical, required, or essential feature of any or all the claims.

The specification and illustrations of the embodiments described herein are intended to provide a general understanding of the structure of the various embodiments. The specification and illustrations are not intended to serve as an exhaustive and comprehensive description of all of the elements and features of apparatus and systems that use the structures or methods described herein. Separate embodiments may also be provided in combination in a single embodiment, and conversely, various features that are, for brevity, described in the context of a single embodiment, may also be provided separately or in any subcombination. Further, reference to values stated in ranges includes each and every value within that range. Many other embodiments may be apparent to skilled artisans only after reading this specification. Other embodiments may be used and derived from the disclosure, such that a structural substitution, logical substitution, or any change may be made without departing from the scope of the disclosure. Accordingly, the disclosure is to be regarded as illustrative rather than restrictive.

What is claimed is:

1. A sliding component comprising:
a sliding layer comprising a first major surface and a second major surface spaced apart by a thickness, wherein the first major surface can lie along a first plane and the second major surface can lie along a second plane such that the first and second planes do not intersect at any location therealong; and
an intermediate component comprising an embedded portion within the sliding layer, and an exposed portion external to the sliding layer, the exposed portion comprising at least two undercut portions having an angle less than 90° with respect to the second major surface of the sliding layer, the intermediate component coupled to the sliding layer, wherein the intermediate component has a thickness, T, and wherein an exposed thickness, TE, of the intermediate component is less than T, wherein the intermediate component comprises a material having a yield strength of no greater than 500 MPa, wherein the undercut portions of the intermediate component forms cavities, wherein the cavities are at least partially defined by the second major surface of the sliding layer and the intermediate component, and wherein at least two of the undercut portions have different angles.

2. The sliding component according to claim 1, wherein at least a portion of the intermediate component further comprises a corrosion resistant coating.

3. The sliding component according to claim 1, wherein the intermediate component comprises an expanded mesh.

4. The sliding component according to claim 3, wherein the expanded mesh further comprises a plurality of interconnected strands and at least one aperture extending through a thickness of the expanded mesh.

5. The sliding component according to claim 1, wherein the intermediate component comprises a sheet having at least one textured portion disposed therealong.

6. The sliding component according to claim 5, wherein at least one of the textured portions includes a recess, a projection, a deformation, an aperture, or a combination thereof.

7. A bearing comprising:
a sliding layer comprising a first major surface and a second major surface spaced apart by a thickness, wherein the first major surface can lie along a first plane and the second major surface can lie along a second plane such that the first and second planes do not intersect at any location therealong;
a substrate; and
an intermediate component comprising an embedded portion within the sliding layer, and an exposed portion external to the sliding layer, the exposed portion comprising at least two undercut portions having an angle less than 90° with respect to the second major surface of the sliding layer, the intermediate component disposed between the sliding layer and the substrate and partially embedded into each of the sliding layer and the substrate, wherein the intermediate component comprises a material having a yield strength of no greater than 500 MPa, wherein the undercut portions of the intermediate component forms cavities into which the substrate flows, wherein the cavities are at least partially defined by the second major surface of the sliding layer and the intermediate component, and wherein at least two of the undercut portions have different angles.

8. The bearing component according to claim 7, wherein the intermediate component comprises an expanded mesh comprising a plurality of interconnected strands and at least one aperture extending through a thickness of the expanded mesh.

9. The bearing component according to claim 7, wherein the intermediate component defines a thickness, T, and an exposed thickness, TE, as measured by a maximum distance the intermediate component extends from the sliding layer in a direction normal thereto, and wherein TE is less than T.

10. The bearing component according to claim 7, wherein the sliding layer and intermediate component abut along a contact interface.

11. The bearing component according to claim 7, wherein the sliding component and substrate are attached to one another at least partially by calendaring.

12. The bearing component according to claim 7, wherein the intermediate component comprises a sheet having at least one textured portion disposed therealong, and wherein at least one of the textured portions includes a recess, a projection, a deformation, an aperture, or a combination thereof.

13. A method of engaging a sliding layer and a substrate together comprising:
providing a sliding component including a sliding layer comprising a first major surface and a second major surface spaced apart by a thickness, wherein the first major surface can lie along a first plane and the second major surface can lie along a second plane such that the first and second planes do not intersect at any location therealong, and an intermediate component partially embedded in the sliding layer, wherein the intermediate component comprises an embedded portion within the sliding layer, and an exposed portion external to the sliding layer, and the exposed portion comprises at least two undercut portions having an angle less than 90° with respect to the second major surface of the sliding layer; and
applying the sliding component and substrate relative to one another such that the exposed portion of the intermediate component at least partially embeds within the substrate, wherein the intermediate component comprises a material having a yield strength of no greater than 500 MPa, wherein the undercut portions of the intermediate component forms cavities into which the substrate flows, wherein the cavities are at least partially defined by the second major surface of the sliding layer and the intermediate component, and wherein at least two of the undercut portions have different angles.

14. The method according to claim 13, further comprises: applying heat to the substrate.

15. The method according to claim 14, wherein applying heat to the substrate is performed prior to applying the sliding component and substrate relative to one another.

16. The method according to claim 13, wherein applying the sliding component and substrate relative to one another is performed at least partially by molding.

17. The method according to claim 13, applying the sliding component and substrate relative to one another is performed at least partially by calendaring.

18. The method according to claim 13, wherein providing the sliding component further comprises applying a corrosion resistant coating along at least a portion of the intermediate component.

19. The method according to claim 13, wherein the intermediate component comprises an expanded mesh comprising a plurality of interconnected strands and at least one aperture extending through a thickness of the expanded mesh.

20. The method according to claim 13, wherein the intermediate component defines a thickness, T, and an exposed thickness, TE, as measured by a maximum distance the intermediate component extends from the sliding layer in a direction normal thereto, and wherein TE is less than T.

* * * * *

UNITED STATES PATENT AND TRADEMARK OFFICE
CERTIFICATE OF CORRECTION

| | | |
|---|---|---|
| PATENT NO. | : 10,428,874 B2 | Page 1 of 1 |
| APPLICATION NO. | : 14/974608 | |
| DATED | : October 1, 2019 | |
| INVENTOR(S) | : Juergen Hartmann et al. | |

It is certified that error appears in the above-identified patent and that said Letters Patent is hereby corrected as shown below:

On the Title Page

Item (56), Foreign Patent Documents, page 2, Line 1, please delete "EP 1132632", and insert --EP 1132634--

In the Specification

Column 6, Line 33, please delete "epoxoide", and insert --epoxide--

Signed and Sealed this
Fifteenth Day of February, 2022

Drew Hirshfeld
*Performing the Functions and Duties of the*
*Under Secretary of Commerce for Intellectual Property and*
*Director of the United States Patent and Trademark Office*